March 25, 1941.   B. H. MOSSINGHOFF   2,236,346
BRAKE DEVICE
Filed Nov. 6, 1937   2 Sheets-Sheet 1

INVENTOR.
Bernard H. Mossinghoff

March 25, 1941.   B. H. MOSSINGHOFF   2,236,346

BRAKE DEVICE

Filed Nov. 6, 1937   2 Sheets-Sheet 2

INVENTOR.
Bernard H. Mossinghoff

Patented Mar. 25, 1941

2,236,346

UNITED STATES PATENT OFFICE 2,236,346

BRAKE DEVICE

Bernard H. Mossinghoff, Chicago, Ill.

Application November 6, 1937, Serial No. 173,102

25 Claims. (Cl. 188—78)

This invention relates to controllably retarding or frictionally stopping movable machine elements, with particular application to the wheels of an automobile, and aims to better perform such functions through improved instrumentalities. Reference is made to my copending application Serial No. 122,176, filed January 25, 1937, for Brake devices.

Some objectives in automobile brake designing, emphasized since the advent of four-wheel brakes, aim at providing a suitably light and convenient foot-work requirement in pedal stroke and pressures; and at the same time aim to avoid too great inconstancies in the effective braking torque, due to the ever present frictional coefficient fluctuations. Such two objectives commonly oppose and mutually limit each other, as each is attainable to a high degree with heretofore known principles, if the other objective could suitably be disregarded; accordingly a substantially deficient compromise is struck in the actual designs for non-powered, namely driver actuated, brakes.

My invention aims to increase the practical range, to a very substantial extent, between these antithetical limitations. And still further, an attainable objective in this respect, is the provision of a comparatively low-positioned, short-stroked, and quickly applicable brake pedal, of substantial advantage, if considering the fact that an automobile travelling 30 miles per hour, moves 22 feet in one-half second's time.

With pedal stroke and maximum pressure being elementarily in inverse relation, it is obvious that the foot-work requirement factor is reducible by employment of a drum-radially directioned application force for the retarding element, which incidentally would permit, if desired, the same application force to become operable for both rotational directions, and in view of the fact that a single radius translation, is approximately ⅙ that of a full circumferential take-up of the clearances between the lining and the drum. However, there would event a substantialy unwanted pyramiding of inconstancies due to accidental coefficient fluctuations, in a simple radially applied system and in view of the upper limitations in the range of frictional coefficients of linings, acceptable as good practice. Furthermore, with a dually directionally operative servoing element, the retraction tensioning provided for the served retarding element or elements, if made reliably positive, is an appreciable burden on a practically coefficiented servo element.

Again, brake drums are never truly rigid, but are considerably distortable according to the distribution of the radial braking stresses thereagainst, which unless provision is made therefor, would tend to force the servo element inwardly, and intensify brake application unless a heavier foot application pressure were designedly applied to such radially applied servo element, at the sacrifice of the foot-work requirement factor, which, in turn, would intensify such inward tendency, as far as respects the conveniently pressured pedal, because of the changed ratio of the pedal to said servo element, which such higher application pressure involves.

Accordingly I am presenting an integrating combination of elements, which besides the radial application princple and other features, provide for automatic brake-torque-controlled torque correction, to considerably more than offset the inconstancy tendencies intrinsic to radial application, so as to permit a small foot-work factor, involving also a short pedal and mechanism stroke, as compared with the application movement at the brake and with the drum distortion quantities, which short pedal stroke has the further important purpose of quick and convenient brake application by the automobile driver. This implies that a fairly high self-energization factor is employed, to which factor exaggerations of inconstancies in brakes are usually directly ascribable, but which in my invention is more than compensated for. It implies also that a part of the braking torque force is burdened upon the foot, but which upon calculations will be found also to be more than compensated for. In this last connection I would prefer to employ functioning ratios in the design, so that it might be truly said that the foot pressure through mechanical connections directly and predominantly determines the amount of the total effectual braking torque; a surplus of foot presure beyond the torque-opposition requirement, being automatically shunted towards the brake application function, to an extent which would tend to produce such amount of foot-determined total effectual brake torque. Any supernormal amount of total brake torque ratio to application presure would automatically reduce the effectual application pressure, as compared with normal; and any subnormal decrease in torque, automatically increases the effectual application pressure. Accordingly I am presenting herein also a torque-controlled torque correction feature, in an organic and mutually compensating and interfunctioning combination with other features and functions.

Accordingly, one of the principal objects of my invention is to provide reduced foot-work requirement for actuation of the brake, so as to permit of a low-positioned short-stroked pedal for the purpose of safety by quick application, and for the operator's convenience as to leg-raising.

A further object, quantitatively correlated and partly interchangeable with the above object, is to provide improved brake torque constancy in view of the frictional coefficient fluctuations. Thereby tendencies towards skidding, sway, chassis strains, etc., are reduced because of improved equalization between the four vehicle wheels; as also a better constancy at each wheel, as to accidental wheel-locking, etc.

A further attainable object is small pedal stroke increase upon lining wear, permitting comparative infrequency of adjustments and care.

Another object is to provide a greater practical range for quantitative brake designing.

Another object is to provide good brake lining life.

Another object by preference, is to provide self-amplification of initial torque by leverage multiplication and preferably also by reactional angulation of the stress line in a system of servo shoe actuation of a served element.

Another object by preference is to provide self-amplification of brake torque by chordal angulation of the communicated torque stress for anchoring; also preferably by employment of the more constant species of self-energization, namely flexible self-wrapping, for a portion of the brake torque.

Further objects pertain to providing antifrictional bearing construction for communication of heavy brake torque force; consolidation of a multiplicity of functions in fewer structural members; structure for actuation force equalizing or proportionment between the several brake units in a vehicle; provide in a brake shoe a duality of spread contacts to permit shoe flexibility to conform to a distorted drum; provide cushioning means in the mechanical train to reduce shock, etc.; to provide an indication, advisory for adjustment desirability. And still further objects, some pertaining to production and design parts, as they become apparent in the disclosure.

It is of course understood that because of different standards or desires of different designers, as to the quantitative and other variables of my invention, some of the objects may more intensely be sought after at the sacrifice of others; my subjective invention embracing various embodiments of the principles involved, of which the particular herein illustrated form represents one preferred specimen.

In the illustrations.

Similar characters refer to similar parts throughout the several views. In the following description, the several character numerals are underscored at their respective first appearances, to facilitate locating the definitions of the respective parts.

The particular form of my invention, chosen as preferable for this disclosure, pertains to an automobile, having the channelled chassis frame 11, the two front wheels 12 and 12' and the two rear wheels 13 and 13', each wheel having a brake drum, as 14, affixed for rotatability therewith, as also the brake backing plate 15, as a fixed anchoring and mechanism support, firmly fixed to chassis parts, all as conventionally.

Circumferentially disposed within the said drum 14, so as to become frictionally engageable therewith, is the retarding device, designated as 17, shown as of the flexible band type partly reinforced, though any suitable known type of shoes or band or combinations may be employed; which retarding device 17 accordingly comprises the substantially flexible steel band 16, shown as cylindrical, of consequently sufficiently thick material to resist undue distortion. Firmly mounted on the said band 16 is the frictional facing 18. The device 17 comprises also the reinforced ends, including the channel-like double-webbed stamping 19, for the right end and a similar channel 20 on the left end portion, both somewhat narrower than and firmly affixed onto the inner surface of the said steel band 16, the left channel 20 however, extending along a greater arc of the drum 14, for better distribution of the pressure and facing wear at such end, which is the high torque end for forward braking, namely when the drum 14 rotates counter-clockwisely in the direction indicated by the arrow 21.

To apply and press said retarding device 17 against the drum 14, I provide in this preferable form a substantially rigid servo shoe, indicated as 22, having the arcuately formed outer channel member 23, to which is affixed the friction facing 24, of suitable frictional coefficient, which may however, by preference, be higher than that of the facing 18 of the retarding device 17. By outward from drum center actuation, the facing 24 engages the drum 14, and will be described as limitedly rotated by said drum, for actuation of the retarding device 17. For further strengthening of the servo shoe 22 and for preferably providing spaced final stress points, in view of the appreciable irregular functioning distortions usual in brake drums, I provide also the inner and narrower arcuated channel-like member 25, affixed to the inner surface of the said channel 23, by any suitable means, as rivets, which incidentally would permit a slight relative forced dislocation; the contacting ends of said channel 25 being of slightly longer drum center directioned radius than its middle portion, the webbing of which is formed of gradually decreasing width (Fig. 2) for firmer support of the cylindrical surface 25', concentric with drum center preferably, and on which surface rides the stamped shoe-applying roll-sector 26, the arc of the lower rolling surface of which is preferably, though not necessarily fully so, concentric with its pivot pin 27. The said curvature on roll-sector 26 could conform to incidental purposes, such as serving to indicate adjustment advisability through pedal feel, etc., whilst its general function remains substantially the same. The said roll-sector 26 has the function not only to thrust the servo shoe 22 against the drum 14, but it is also forcefully revolved on its said pivot 27, serving effectually as a lever, in order to apply the retarding device 17, by means of any suitable abutments or connections such as the originally flat, but punched and formed strips 28 and 28', such forming providing larger contacting surfaces for abutting against the roll-sector 26 at their mutually inner ends, and which strips are firmly fixed on the base of the channel member 25.

The rotation of the said roll-sector 26 about its pivot pin 27, operates to apply and press the retarding device 17 against the drum 14, for the counter-clockwise direction of drum rotation, by means of the connecting thrust bar or link 29, stamped and formed from originally flat metal, and having a transversely broad rectangular right end for abutment connection against a correspondingly broad and transversely straight, but long radiused convexedly cylindrical bearing surface, forged and preferably thereafter milled on the lower portion 30 of an adjusting member to be later described, within the webs of the channel 19. The permissably narrower left end of the said bar 29 is slightly bifurcated to provide twin lateral guiding extensions (similar as is shown at the right end of part 32 of Fig. 3) to both sides of the width of the roll-sector 26, within which extensions is the thrust contact surface, flatly rectangular for thrust abutment against the cylindrical surface on the roll-sector 26, in the recess 31. Accordingly, with the swinging of the said roll-sector on its pin 27, the roll-sector forcefully thrusts against the said bar 29 rollingly, which bar in turn at its right end thrusts against the member 30 for applying and pressing the retarding device 17 of which the said member 30 may be considered as virtually a part, against the drum 14, for brake torque initiation on said retarding device. The term "torque" throughout this specification and the claims, will refer only to the braking torque.

For the reverse direction braking, corresponding to the clockwise rotation of the drum 14, the corresponding swinging of the roll-sector 26 leftwardly on its pivot pin 27, applies the left end of the retarding device 17 for such direction, in a similar manner and through similar instrumentalities as has just been described for the forward braking, by means of the connecting thrust bar or link 32, stamped from originally flat material and having a transversely broad, flat and rectangular left end to abut against the somewhat rounded transversely straight edge of a hardened stamped semi-circular aligning disc 33, its cylindrical periphery 34 riding against a correspondingly arcuated plate firmly affixed to and within the channel 20. The originally flat, then formed, fixed flat strips 35 and 35' serve to retain the left end of the bar 32 in place. The right end of said bar 32 is slightly forked to provide lateral guide extensions (Fig. 3) to both sides of roll-sector 26, its thrust bearing end within the throat of said extensions being a stamped flatly rectangular, but sheathed by a hardened steel channelled bearing liner 36, mounted thereover, for abutting against and receiving the stress from the cylindrical surface formed on the said roll-sector 26 in the recess 38. Said liner 36 incidentally provides a longer rolling contact surface, in view of the normally greater facing wear at the left portion of the retarding device, in view of the relocation of the bar 32 due to such wear. However the effectual stress line would approximately continue to pass through the center of the surface arc formed on the roll-sector. Both of the thrust bars 29 and 32 serve also for anchoring and transmitting the respective brake torque stresses, as will hereinafter be described.

Figures 5, 7, 8, 9:
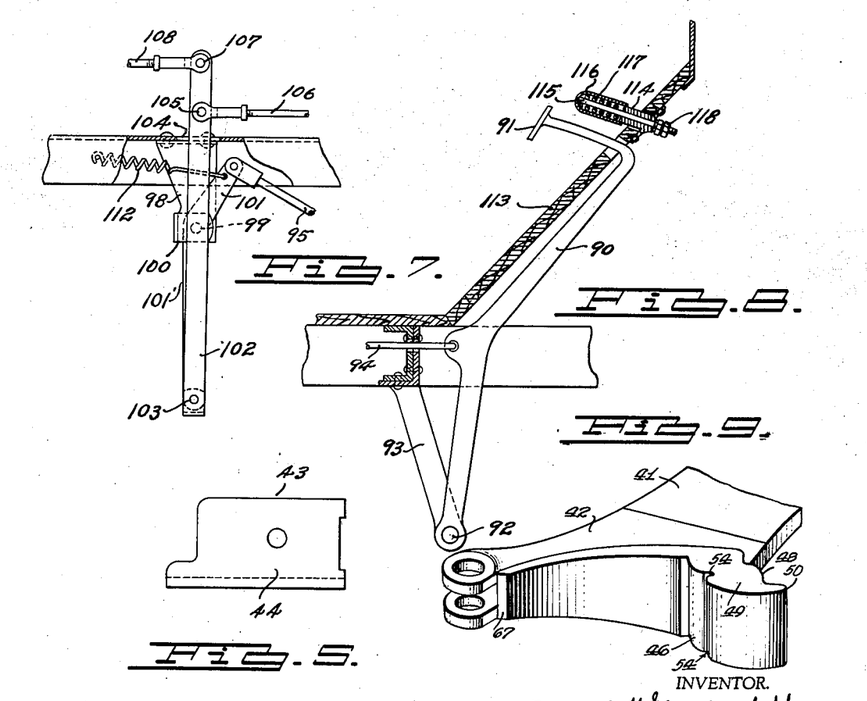
Fig. 5 is a face view from below of the other fixed fulcrum bracket member.
Fig. 7 is a plan view of one of the two similar actuation force proportioning devices indicated in Fig. 6.
Fig. 8 is a side elevation of the actuating brake pedal, the floor boards and the cross-frame member in section, and with the adjustment advisability indicating device near the pedal pad, in section.
Fig. 9 presents details of structure of lever 42, in perspective, as viewed from below, in Fig. 1.
Figure 6:
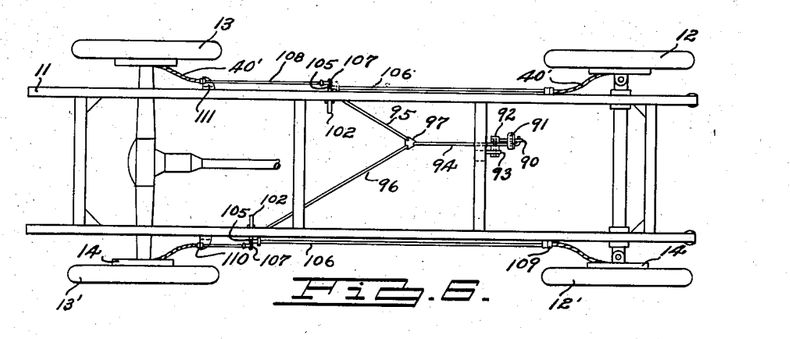
Fig. 6 is a plan view of the automobile chassis frame and wheels, showing the actuation force communication rigging, as associated with the several brake units.

The brake is applied by external force particularly as illustrated, by the muscular energy of the automobile operator by depressing a conventional-like pedal, which exerts a leftward pull on the conventional flexible cord or wire 40, attached to the upper end of the long stamped lever arm 41, shown as resistance buttwelded onto forged lever 42, carrying the aforesaid pin 27 at its left bifurcated end, and which lever fulcrums in a special manner on the right hand edge of a 90 degree angle member 43, one of the sides of which is rigidly affixed to the backing plate 15 in any suitable manner as by welding, thus providing a rigid perpendicularly and drum-axially upstanding flange 44, as a fulcrum. To laterally retain said lever 42 the right edge of said flange 44 is recessed (Fig. 5), providing a broad and rectangularly flat bearing foundation, over the surface of which a 90 degree angled hardened steel sheath or liner 45 of full bearing width, is mounted for directly receiving the heavy brake-torque stress from said lever during the reverse braking. To reduce the frictional bearing losses in a simple and inexpensive manner during such reverse torque reception functioning, said lever 42 has formed thereon a long radiused convexedly cylindrical bearing surface 46, to contact with and roll-rock with a small amount of movement on said liner 45. To communicate the reverse braking torque to said lever 42, I provide in the broad thrust bar 29 a large substantially rectangularly punched orifice 47, the right wall of which is straight and flat-surfaced and rollably rides and thrustingly abuts against a broad, long-radiused and convexedly cylindrical bearing surface 48, formed on the lever 42, the center of this last-mentioned radius preferably located near the plane of bearing surface of the aforesaid bearing liner 45, so that facing wear at the right end of the retarding device 17 will not too greatly affect the short effectual lever arm 49 of lever 42. This arm accordingly extends through the orifice 47 in the bar 29 and has an integral tapered guiding nib 50 cooperatively contacting with a specially formed strip 51 riveted on the bar 29, to properly register the bar on said lever. From what has been explained it becomes apparent, that upon reverse braking, namely upon clockwise rotation of the drum 14, the brake thrust is communicated through the bar 29, onto said lever arm 49, tending to rock the lever 42 on its bearing surface 46 in a clockwise direction, with the effect of stressing the pivot pin 27 and the roll-sector 26 away from the drum, thereby effectually lessening the application pressure between the servo shoe 22 and the rotating drum with the ultimate effect of decreasing the total reverse braking torque. The effect of such torque on the servo shoe application is reduced by reason of the relative effectual shortness of the lever arm 49 in comparison with the longer lever arm from the pivot pin 27 to the rock bearing at 46. Effectual lever arms and their lengths, of course, conform with the perpendicular line from the bearing center to the line of stress, independently of shape or structure of the lever.

For simplicity reasons, I prefer to employ the said same lever 42 not only for the mentioned torque transmission during reverse, but also as the servo shoe application lever for either direction of rotation, though the functions are separable. Accordingly, on the fixed fulcrum bracket 44, I affix, preferably firmly by means of rivets, the flat and broad hardened steel bearing plate 53, its right edge extending into the milled throat 54, of the lever 42, the lower wall of said throat bearing against the lower surface of said plate 53 for brake application stress fulcruming, at least during forward braking. The milling of said throat can be slightly slanted so that chiefly the outer edge of the said throat will bear against the plate 53. To securely retain the lever 42 in bearing contact and in assembly on the fulcrum bracket 44, I provide a tensioned looped wire spring 55, the middle portion of which sockets under the lip 56 of the metal clip affixed to the bracket 44 and the open ends of which pass to both sides of the lever 42 and are bent to socket in forged depressions in the said lever. The tension of said spring 55 is directed to tension the lever 42 firmly leftwards.

For the purpose of transmitting the brake torque to variably reduce the pressure between the servo shoe 22 and the drum 14, during the forward rotation braking, I provide a structure somewhat similar in function as was explained for the reverse rotation braking. An angle member 57, angled 90 degrees, with its one flange firmly fixed to the backing plate 15, so that its other flange provides an axially upstanding bracket 58, which has a T-shaped punched orifice therein to accommodate the forged torque transmitting lever 59, which has a long-radiused broad convexedly cylindrical rock bearing surface 60 formed thereon to rollably and thrustingly abut against the full bearing lengthened hardened steel channel-shaped bearing liner 61, mounted snugly adjacent to the flat right wall of the said T-shaped punching in the bracket 58. On the short lever arm 62 of lever 59, I provide a similar broad, long radiused, convexedly cylindrical rockably rolling bearing surface 63, arranged to thrustingly abut against the flat perpendicularly punched left wall of a large substantially rectangularly punched hole in the flat thrust bar 32, which latter is provided with a tapered guiding protuberance 64, cooperating with the stamped guiding bracket 65, fixed onto the said bar 32 to properly register the location of the said bar on the said lever arm. The location of the center of the arc of the bearing surface 63, is preferably near the apex of the right angle, having its two sides passing through the two bearing surfaces, so that facing wear and consequent deflection of the bar 32, would not materially affect the leverage ratio, of the lever 59. The line of torque thrust stress through the said bar 32 would continue with close approximation to pass through such apex point notwithstanding facing wear of the left end portion of the retarding device 17. The right end of the said lever 59 is forged with a closed loop encompassing and accommodating the roll-sector 26 and extends to the right side thereof to abut and upwardly bear against the flat surface 67, formed on the under side of the lever 42 to communicate the forward braking torque pressure in the mentioned direction thereto, and thus to decrease and oppose the pressure between the servo shoe 22 and the drum 14. Obviously the greater the brake torque in the retarding device 17, the greater is such opposition. The shown respective lever arm lengths and the apparent quantities disclosed indicate that the opposition of the servo shoe application against the drum is of smaller pressure than the total torque pressure in the retarding device 17. To aid in holding the lever 59, in its normal location on the fulcrum bracket 58, and to tension said lever against lost-motion and against rattles, I provide the tensioned U-shaped blade spring 68, its lower end retainingly lipped into the punched hole in the fulcrum bracket 58 and its upper end lipped into a retaining notch forged in the lever 59, which has a retaining shoulder contacting the liner 61; a similar construction being provided also on the lever 42. The stored tension of the said blade spring tends to turn the lever 59 counter-clockwise. For positive prevention of dislocation of said lever from assembly, I provide a slight projection 69 formed in the lever 59 to extend somewhat leftwardly beyond the punched-out hole in the fulcrum bracket 58. Assembling is accomplished by turning lever 59 considerably anti-clockwise. The lower blade of the said spring 68 is bifurcated so as to pass to both sides of the narrowed rib of the lever 59, the outer periphery of said rib being closely adjacent to the left wall of the punched cut-out in the fulcrum bracket 58. Said fulcrum bracket is angularly positioned so that the resultant line of all the stresses in the lever 59 is perpendicular to the bearing contact surface, on said fulcrum, and lining frictional coefficient fluctuations will not materially affect such perpendicular relation, which in view of the lever 59 serving for the preponderant forward high torque transmission, is the principal reason I have preferred consolidating the actuation lever arm 41, with the reverse torque lever 42, instead of with the lever 59, notwithstanding that a truer antifrictional rolling friction also for the brake applying stress function, for the highly prevalent forward braking would be better obtainable under conditions of constancy of normal lining coefficient, if the said lever arm 41 were fixed to the lever 59 with corresponding change in angulation of fulcrum bracket 58, instead of to lever 42, as is illustrated; and which latter consideration may prevail with other individuals in the usual diversities in designing. In fact some may desire to structurally separate the application function from the torque transmission function, especially if a greater stroke for the pull cord 40 is desired.

For adjustably compensating circumferentially for the wear of the facing 18, I provide the internally threaded adjusting nut 71, fitted on the threaded end of the forged adjusting member 72, mounted as circumferentially movable adjacent to the cylindrical inner surface of the channel 19, the cross-pin 73 affixed transversely in the webs of the said channel, retaining said member 72 in place with a small amount of tensioned lost-motion, between said member 72 and the bottom of channel 19, so as to permit the cushioning blade spring 74, which is mounted with firm initial tension within recesses of the member 72, thereby firmly pressing the portion 30 against the said pin 73, to cushion the stress through the bar 29. At the end 30 of the member 72, I provide an open-slotted originally flat retaining member 75, held in place by the pin 76, and which member partly encompasses a reinforcingly thickened rib in the adjusting member 72, short inner projections at the said slotted openings hooking about said thickened rib. The adjusting nut 71, has an annular groove, with the pressure face being preferably spherically rounded for ball socketing against the originally flat materialed fixed strap 77, riveted onto the steel band 16, and at its other end looping around the transverse pin 78, fixedly mounted transversely in the dual webs of the channel 19. Said strap accordingly has a three quarter circularly formed slot fitting over the annular groove of the said nut 71, which punched out slot is continued into the portion adjacent to the steel band 16 so as to permit insertion of the head of the nut 71 before fixing the said strap 77 in place. The nut head is suitably nibbed along its outer periphery for convenient adjusting tool engagement, and a blade spring 79, fixed on the strap 77, engages said nibs to prevent unwanted rotation of the nut 71. The heavier stress contact between the adjusting member 72 and the bottom of the channel 19 is preferably at the end 30 thereof, the contact surface of which member 30 is preferably slightly rounded with a radius somewhat shorter than the corresponding drum radius, and preferably is also rounded transversely to permit lateral self-aligning rock, when thrusting against the bar 29. However any known circumferential adjusting means might be employed in the place of the structure illustrated.

Figures 1, 2, 3, 4:
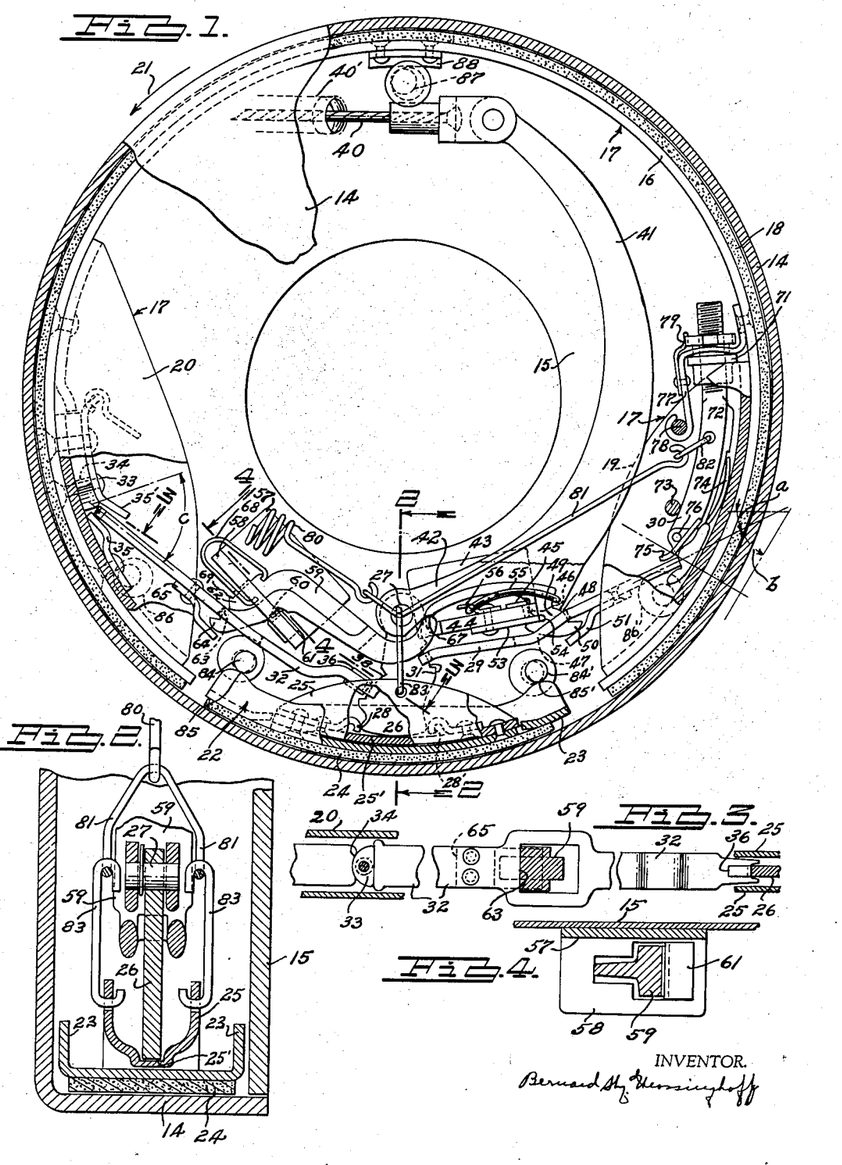
Fig. 1 is an elevational view of an automobile wheel brake, looking from the wheel side, with the drum in section and parts of the channel reinforcements cut away. The parts are shown in brake released position.
Fig. 2 is an enlarged sectional elevation on the line 2—2 of Fig. 1.
Fig. 3 is a partly sectional view on the line 3—3 of Fig. 1.
Fig. 4 is a face view of the fixed fulcrum bracket, other adjacent parts in section, taken on the line 4—4 of Fig. 1.

I provide also, for the yieldable retraction of the servo shoe 22 and of the retarding device 17 away from the drum 14, for brake release, by providing the solitary contractilely tensioned spring 80, attached at its left extremity to the left end portion of the retarding device 17, and with its right extended extremity hooking over the closed loop of the connecting wire 81, encompassing the lever arm 41 to both sides thereof, and having its two right extremities hook over the closed looped wire 82, movably mounted on the adjusting member 72. Said connecting wire 81 is formed depressed to permit the twin servo shoe connecting wires 83, one on each side of the roll-sector 26, (Fig. 2) to loop thereover at said depression, the lower extremities of the said wires 83, hooking into punched holes in the webs of the reinforcing channel 25, (Fig. 2). Accordingly the said solitary spring 80 tends constantly to pull the servo shoe and the both ends of the retard-in device 17 inwardly towards the drum center; and in addition the steel band 16 may itself have an intrinsic contractile tension. Any known retracting system may of course, be employed in place of the illustrated. Also any known guiding means for the retarding device and the servo shoe may be employed to prevent their interference with the disc portion of the rotating drum 14.

Adjusters for clearance between the frictional facings and the drum are also provided. For the servo shoe, I provide the twin eccentric adjusters 84 and 84', adjustably revolvable in the backing plate 15, and then locked thereon by means of a threaded nut in the conventional manner, and having axially upstanding eccentrically disposed shanks, for contact with both of the webs of the channel 23, to accommodate which, the edge surfaces 85 and 85' of which channel protrude slightly inwardly towards the drum center, so that when the servo shoe 22 rotates with the drum 14 to either side of its shown center brake-released position, there would no interference therewith by the eccentric adjusters 84 and 84' even if they be closely adjusted, and even though the appreciable forceful outward drum distortion at the high point of radial pressure of the retarding device 17 against the drum 14 may tend to compensatingly force the said drum inwardly at the servo shoe portion thereof. Such drum distortion is known to be larger at its open edge, than at its closed or disc edge.

I also provide the conventional-like eccentric adjusters 86 and 86' directly contacting the cylindrical steel band portion 16 of the retarding device 17, between the backing plate 15 and the respective reinforcing channels of the said retarding device. I furthermore provide the eccentric adjuster 87, having an annular groove, so as also preferably to serve as a guide, in which groove the flange 88, affixed to the steel band 16, rides. Since the served retarding device 17 may have and preferably has a greater amount of facing clearance than the servo shoe 22, no extra provision for the mentioned drum distortion interference by its eccentric adjusters is disclosed, such clearances not affecting the pedal stroke. But the known art may be applied to substitute for the adjusters illustrated.

One of my objects in attaining improved braking constancy relative to frictional coefficient fluctuations, is to attain also improved equalization between the four wheels of the automobile, to aid in preventing skidding, sway and undue chassis strains. Accordingly I illustrate equalization structure in the brake rigging, associating the actuator pedal with the respective brake units at the wheels. The pedal lever 90, having the foot pad 91, is pivotally mounted at 92 in any suitable or conventional manner on the chassis of the automobile, as on a bracket 93, depending from a cross-member of the frame 11. This pedal is connected by means of the suitable rods 94, 95 and 96, which themselves interconnect by means of the triangular connecting plate 97, having three holes to movably accommodate the ends of the said rods, said means of interconnection permitting pressure-responsive lateral floatability to communicate proportionately equalized stresses, according to the relative angulations, which in the illustrations are shown as equal, along the two connecting rods 95 and 96. Each of the latter connect respectively with a pair of equalizing devices mounted on the respective side channels of the chassis frame 11, said pair being mutually disposed opposedly in respect to the longitudinal center line of the frame, but one of which is mounted farther to the rear in the frame in respect to the other in order to attain preferably an equal angulation between the rods 95 and 96 in respect to the pedal actuated stress line along the connecting rod 94. However, by changing such angulations or other leverages, the relative locations of the devices may also be changed. The said dual equalizing devices are similar and each comprises a bracket 98, firmly affixed within the side frame channel to provide support for the bearing pin 99, the upper end of which pin is additionally supported by the ear portion 100, doubled over integrally from the bracket 98. On said fixed pin is pivoted the lever whose arm 101 pivotally connects with the rod 95, and whose other arm 101' extends inwardly in respect to the chassis frame to pivotally provide support for the inner end of the floating equalizing bar 102, which is formed doubled-over at its said inner end to provide an ear for better double support for the pivot pin 103, the end of the lever arm 101' being accommodated within the throat provided by such doubled-over end of the bar 102. At the outer portion of the said bar 102, and as illustrated preferably outside of the frame channel which accordingly is provided with a guiding slot 104 punched in said channel, through which said bar 102 projects, I provide the adjustable clevis connections 105 accommodating the connecting rod 106 leading to a front wheel, and a similar connection 107, for the connecting rod 108, leading to the rear wheel brake unit assembly. Each of the said connecting rods 106 and 108 lead into a conventional fitting 109 and 110 respectively forming the end of the flexible pull-rope housing 40', to which pull wire the respective rods 106 and 108 connect all as conventionally and as known in the art. The said fittings 109 and 110 are firmly bracketed onto the frame channel, the bracket 111, for the rear fitting extending farther from the chassis frame to properly support its cooperating parts. Preferably I provide a contractilely tensioned spring 112 connecting between a fixed point on the chassis frame and the lever arm 101, with a tension to force the said lever arm 101 retractively rearwardly for brake release. The relative locations of the points 105, 107 and 103 indicate that the greater stress is communicated to the forward brake unit, which seems desirable. Otherwise the leverages in the brake units may be altered to suitably accommodate. If stiff link connections were desired to replace the flexible cord 40, leverage compounding, or a rearrangement, may be resorted to in the brake units in order to provide a greater stroke to the member spanning between the brake unit and the chassis frame.

Since a further attainable object of my invention is to permit of a low-positioned, short-stroked and quickly applicable brake pedal, the travel of which due to wear may be short, I preferably provide an indication means, whereby the automobile operator will be advised of the requirement to adjust the several brake units to compensate for brake lining wear, especially if the dimensions chosen in the particlular designs are such that parts in the several brake units would mutually interfere after a definite amount of stroke due to lining wear. For this purpose I provide a foot-feel indicator mounted on the automobile toe-board 113, through which the shank of the casting 114 projects. This casting has a longitudinal bore to slidingly accommodate a round guiding rod 115, to the outer extremity of which is affixed the thimble 116, whose lower open end guidingly slides over the said casting 114. A tensioned compression spring 117, is mounted as encompassing the said rod 115 within said thimble, and has the tendency to forcefully retain the said thimble outwardly, the nut 118 abutting against the lower surface of the said casting 114 to limit such outward extensibility. The closed extremity of the said thimble 116 is to be contacted by the shoe sole of the pedal operating foot, after a determined amount of lost-motion stroke of the pedal pad 91, which stroke has relation to the amount of the wear of the facing 24 on the servo shoe 22 in the respective brake units, which amount of wear generally bears a quantitative relation to the amount of wear of the lining 18 of the retarding device 17; an additional safety factor and lee-way being provided for possible discrepancies, in the setting of the thimble 116 in relation to the pedal pad 91, by means preferably of the adjusting nut 118. When the sole of the operating foot contacts and pushes against the said thimble, the spring 117 contracts. This spring is preferably to be provided with sufficient tension so as to tend to tilt the operator's foot and interfere with the customary convenience of pedal operation.

As to the operation, for forward rotation braking, conforming to the arrow 21, the depression of the pedal lever 90, exerts a pull force on the connecting rod 94, and through the pivotal self-alignment of member 97, divides proportionally such force to the rods 95 and 96, and through the dual devices comprising the self-adjusting floating levers 102 again distributedly proportions such actuation force to each brake unit at the wheels.

Such brake application force pulls the lever arm 41 leftwardly, the connected lever 42 pivoting chiefly on the bottom surface of the fulcrum plate 53, forcing the roll-sector or link 26 (rollers are effectually continuous thrust links) downwardly to apply the servo shoe 22, against the retracting tension of the spring 80; the rotation of said roll-sector 26 on its pivot 27, because of the abutting member 28, applying and pressing the right end portion of the retarding device 17 against the drum, through the intermediacy of the connecting thrust link 29, for initiation of the braking torque in the said retarding device 17. Such retarding devices as 17, give self-amplification of such initial brake torque through chiefly the self-wrapping species of self-amplification, where there is relative flexibility between the retarding device and the drum, to which is added the chordal reaction species of amplification due to the chordal angulation of the brake torque receptive and transmitting bar 32, in respect to its connection with the left end portion of the said retarding device 17. The said brake torque thrust through the bar 32, is communicated to the short arm of the lever 59, pivoting or fulcruming about the fixed fulcrum bracket 58 supported on the fixed backing plate 15, and through leverage thus provided, stresses with reduced force the servo shoe 22 away from the drum, said lever 59 therefor abutting and pressing upwards against the surface 67 on the lever 42 as a preferred construction for torque force transmission and directing. It is practically the equivalent to state that the torque force from the retarding device 17 directly opposes the pedal actuation pressure of the lever 42, with whatever surplus applying force is automatically provided, forcing the servo shoe against the drum.

This just explained directing back of the amplified brake torque to oppose the application pressure, or to oppose the pressure of the servo shoe against the drum accomplishes the potent function of self-correction of the brake torque. If for example and with disregard of the retract tension and of operative friction losses, the brake pedal supplies actuation force, equal to 450 pounds, downward pressure at the pin 27, and if the leverages would normally provide 300 pounds brake torque opposition, as at the same pin 27 (150 pounds effectual application pressure on the servo shoe, thus remaining), and as the normal quantitative relation between the said actuation and brake torque pressures, a 50 per cent accidental total brake torque increase, due to lining coefficient increase would be the infinitively absolute theoretical limit of possibilities, because effectually in such supposition there would be zero actual application pressure through the roll-sector onto the servo shoe, with consequently zero initial torque and accordingly no final torque, barring of course, all incidental considerations of retract spring tensions, resistant mechanical friction, etc. In other words the brake torque would monopolize the total foot actuation, a practical impossibility. This necessitates that for an actual equilibrium of forces a compromise would be struck. On the basis of the above-assumed quantities, and on the basis generally of the structure illustrated with providing a co-efficient for the lining 24 within the range of good practice, as .5, an actual accidental total effective braking torque increase is obtainable, of even less percentage than the pure coefficient change percentage; in other words, so that with an accidental 25 per cent coefficient increase at all of the linings, the system would automatically reach equilibrium with a resultant total braking torque increase of even less than such 25 per cent, with the foot burden remaining constant. In this connection, it should be borne in mind that a 25 per cent accidental coefficient increase in presently employed brakes has an exaggerated resultant effect, due to the self-energization or self-amplification factors employed, for example of 65 per cent total brake torque increase, as commonly encountered. Accordingly in my disclosed device, there would be torque-controlled torque correction.

Such torque self-corrective effect, however, would not be quantitatively as highly favorable for a fading or accidental decrease in lining coefficient, as applies to an increase. On the basis of the above assumed quantitative structure, a 50 per cent actual total braking torque decrease, effects 100 per cent over normal effectual additional application pressure on the servo shoe. With a large percentage of fading, the structure illustrated, would at some point equal the inconstancy ratio of some presently employed brakes, though at least in some respects quicker recovery seems obtainable, due to the accentuation of actuation forces at the important initial torque part of brake systems, namely at the servo shoe in my structure. With a sacrifice in foot-work requirement, however, even greater constancies are of course, obtainable also in the very rare exaggerated fading direction.

From what has been described the servo shoe 22 serves the retarding device through leverage multiplication, for which function the roll-sector 26 serves effectually as a lever, with the bar 29 directly connecting therewith at an intermediate point at 31. Such leverage multiplication is favorable for constancy of torque with a low foot-work factor, but implies a larger free-roll of the vehicle, under certain conditions, not importantly applying to moving vehicle braking, however, since in a vehicle moving only 5 miles per hour, a point on the brake drum might generally be said to rotate 36 inches per second, thus bearing a fair relation to pedal pressure progress in view of yields, etc. In this connection, the cushioning spring 74 provides a time element versus too great shock for tautening the torque system, which thereupon is in stabilized tension for virtually instantaneous responsiveness to actuation and coefficient variations. However, and partly in view of the appreciable retraction tension at the ends of the retarding device, etc., I provide an additional chordal reaction amplification, by means of the angulation of the link 29 being directed upwardly to the right, in respect to a horizontal line passing approximately through the pivot line point 27 and the brake application bearing center of the lever 42 as mounted on the fulcrum 44, and to which line the vertical stress line through the roll-sector 26 is generally perpendicular. The reaction from said link 29, accordingly forces the servo shoe 22 with amplified pressure against the drum 14, which amplification is appreciable because the terms in the progression mathematics are multiplied again by the leverage multiplication ratio of roll-sector 26, as also in a smaller way by the shorter than drum radius distance of the contacts at 28 on the servo shoe.

Such latter amplification of pressure of the servo shoe 22 onto the drum 14, aids in serving another object, namely to modify the effect of the tendency of the servo shoe to be forced towards drum center due to the distortion of the drum which itself is due to the location of the high pressure braking point being at the left portion of the drum, during the forward braking; incidentally the arc length of the reinforcing channel 20, and the torque-receptive stress angulation through the bar 32 with its connection position to said channel, are factors for the location and distribution of such high braking point in relation to the servo shoe 22. Another consideration as to offsetting the disadvantages of an inwardly forced servo shoe as for instance its effect on the pedal position, and its tendency for increasing the application pressure on the servo shoe, pertains to my preference in the designing, for a comparatively small foot-work pedal actuation, such as permits a comparatively short pedal and brake stroke; which virtually implies that for a given amount of application travel of the pin 27, a short travel of the pedal is obtainable, as compared to the present conventional brakes, with the foot-pressure requirement being generally the same as such conventionals. Accordingly, any unwanted forcing of the servo shoe 22 inwardly towards the drum center, for instance to the extent of the brake-released clearance of the facing 24 from the drum, would have only a comparatively small stroke effect or tendency upon the pedal and rigging, and in view of the intrinsic material yields in the application actuation system, such as applies to lever arm 41, etc., any application pressure intensification on the servo shoe 22, due to stress towards drum center becomes minimized in effect, in view of the stroke of a small foot-work pedal being fairly highly ratioed to the material yields, as compared with the conventional brakes of today.

The said type of pressure amplification on the servo shoe 22 due to the reaction of the bar 29, as just explained, however, gives greater brake torque inconstancy, as compared with the pure leverage multiplication method of the part 26 as a lever. An equivalently higher leverage ratioing as a substitute for the combination of the two systems, would of course, improve the torque constancy. I have preferred to consolidate for reasons of structure simplicity, the otherwise separable functions of retarding device actuation and of brake torque reception from said retarding device, in the same unitary links 29 and 32; and notwithstanding such simplification, I aim to attain to a substantial degree, both of the objects of decreased foot-work and of improved constancy for ordinary driving conditions. Strictly speaking either the leverage multiplication system or the chordal reaction system just spoken of, may be used alone; if the latter, it would be the equivalent of permitting the servo shoe to directly contact to thrust against the left end of the link 29, and correspondingly also for link 32, or for the link 32 alone. The servo shoe 22 applying the retarding device through direct contact is another form old in the art, but it would not provide the quantitative advantages sought in my disclosed form. However, it is tolerable to provide smaller quantitative advantages for the comparatively infrequent and less demanding reverse braking.

For such reverse or drum-clockwise braking, the same operations just explained for forward braking are virtually duplicated, but in the reverse order. The quantitative relations between the several members however are illustrated as favoring the forward braking, as to constancy, but with a reduced free car roll, applicable when a stopped car rolls backwards. For instance, the self-correction factor is not as large as for forward, due primarily to the comparative effectual shortness of the lever arm 49, with the result that a greater proportion of the foot actuation pressure is shunted to apply the servo shoe 22 against the drum. However designing preferences would differ with different individuals. Methods of additional cushioning against shock or versus operation roughness seem applicable as matters of mechanical ingenuity.

Because of the large amount of brake torque stresses, of the required shortness of inexpensive lever arm lengths within the confines of a brake drum, implying large movement on large bearings, if lubricated, and of the articulations required for other purposes, the frictional losses in the mechanism would result in a large double-range lag of non-responsiveness between action and reverse action, for torque compensation, if I did not provide antifrictional bearings, as the shown roll rocking type, for the torque stress communication, the special structure illustrated being considered as more durable per cost, than would an equivalent knife-edge or separate roller construction.

A good lining life factor is obtainable by distributing the high lining pressure over a long drum arc by the rigid channel 20, with relation to the point of abutment connection with the thrust link 32, and the reactional angulation of said link 32. Improved pressure distribution may imply also an improvement as to drum stresses and consequent relative distortions. And the location of the high pressure point and the closeness of the rigidification of the channel 20, to the servo shoe 22, also incidentally affects the amount of servo shoe stresses from normal position, due to drum distortion.

Having thus described my invention so that one properly versed in the art, may construct and use it, I hereto append my claims. However, since structure varieties are known in mechanics, as suitable instrumentalities for a defined conveyance or interaction of forces, with which we are primarily concerned, I do not mean, in the claims, to be held to the particularities of the structural forms disclosed, except as becomes apparent.

I claim:

1. In a brake system, a rotatable member with a cylindrical drum portion to be braked in either direction, a relatively anchored retarding device frictionally engageable with the inner surface of said drum and positioned adjacently therewithin so as to leave a gap between its ends, a servo shoe positioned in said gap and arranged to be pressed against the same zone of said drum as said device and thereupon to be limitedly rotated by said drum in either direction and adapted to press the device against the drum by its said rotation in either direction, and a control mechanism for said servo shoe, having an external applying force receptive connection, connections with the respectively directional high torque portions of said device, and structure whereby the brake torque from either direction of rotation opposes the applying force.

2. In a vehicle brake system, a rotatable member having a cylindrical drum portion to be braked in either direction of rotation, a retarding device shiftable limitedly and anchorable reversely for either direction, frictionally engageable with the inner surface of said drum and positioned therewithin so as to leave a gap between its ends, a servo shoe positioned in said gap and arranged to be pressed against the same zone of said drum as said device and to be limitedly frictionally rotated by said drum in either direction, leverage multiplication mechanism arranged to be actuated by said shoe's rotation and having force-dispensive connection to both sides of said shoe with said device to force said device against said drum with amplified pressure upon either direction of rotation, and a brake torque anchoring and transmitting mechanism for at least one direction of rotation, comprising a fixed torque anchoring support, and a member movably sustained thereby, which member has torque-receptive connection with a high torque portion of said device, in respect to said direction, and further torque-dispensive connection with said servo shoe, said support and member combination directing said torque to reduce said servo shoe's pressure on said device, for said one direction.

3. In a brake system, a rotatable drum to be braked, for at least one direction of rotation, a retarding device arranged adjacently therewithin and frictionally engageable therewith, anchor means to check rotation of said device, a servo shoe within said drum arranged to frictionally engage with and be limitedly rotated by said drum, external force actuated shoe applying means, including an applying force communicating member, having applying thrust connection with said shoe, and adapted to be swung by said shoe's rotation about a pivot for said member, a thrust link directly connecting said device and a point on said member intermediate effectually between said pivot and said shoe, so as to leverage multiply the actuating force of said shoe against said device, and means whereby the torque from the braking operation opposes the said applying means.

4. In a brake system, a rotatable cylindrical drum to be braked, a relatively anchored retarding device frictionally engageable therewith, a servo shoe with its applying means, said shoe being arranged to frictionally engage and be limitedly rotated by said drum, and connections from said shoe and its applying means combination to press said device against said drum, comprising a thrust link having direct connection with said device and further force-receptive connection with said shoe and applying means combination, the thrust force line being reactionally angled in respect to its connection with said combination in a direction to give amplified shoe pressure against said drum, and brake torque anchoring means having connection with said thrust link to receive braking torque therefrom for the other rotational direction of said drum.

5. In a brake system, a rotatable member to be braked for either direction of rotation, a therewith frictionally engageable retarding device limitedly shiftable and reversely anchorable in either direction, a servo element arranged to be frictionally engageable with and limitedly rotated by said member, applying means therefor comprising a lever pivoted from a fixed support and a thrust link pivoted on an end of said lever and directly connected with said servo element in a substantially brake-radial initial direction, thus permitting said element to rotate in either direction, said element having connection with said device to both sides for pressing said device against said member in either rotational direction, and a brake torque anchoring and transmitting mechanism for both directions, comprising a fixed anchoring and fulcruming support, and lever means fulcruming thereon, said lever means having torque-receptive connection with said device and further torque-dispensive connection with said applying means, the torque being directed and leveraged by said support and lever means combination so that reduced torque opposes the pressure of said element against said rotatable member.

6. In a braking system a rotatable drum to be braked, in at least one rotational direction, a retarding contrivance arranged to be frictionally engageable therewith, contrivance applying means constructed to direct applying force thereagainst in a substantially drum-radial direction, so as to remain substantially unaffected by circumferential movement of said contrivance with said drum, and a brake torque anchoring and transmitting mechanism, comprising a relatively fixed support with a lever thereon, an effectually shorter arm of which has connection to receive torque from said device, and a relatively longer arm of which is torque-dispensively associated with said contrivance and its applying means combination, in a manner and direction, so that reduced brake torque opposes said application force.

7. In a brake system of the type having a rotatable member to be braked, a retarding contrivance frictionally engageable therewith, and external force communicating means for pressing said contrivance against said member for brake torque generation, a brake torque anchoring and transmission mechanism, comprising, a fixed support, a lever bearing thereon, and a torque-receptive thrust link having connection with a high-torque portion of said contrivance in respect to a certain direction of rotation and reactionally angled in respect thereto so as to amplify to a substantial degree the braking torque at said connection, and further having torque-dispensive connection with a relatively shorter arm of said lever, an effectually longer arm of said lever having connection with said external force means, so that said torque in reduced ratio opposes the pressure between said contrivance and rotatable member.

8. In a brake system having a rotatable member to be braked for either direction, a therewith frictionally engageable retarding contrivance and a fixed backing plate for anchoring the braking torque, a brake torque anchoring and control mechanism for said contrivance movably sustained by said plate, having two distinct brake-torque-receptive connections with said contrivance, one for each rotational direction respectively, and having a further applying connection with said contrivance to press it against said rotatable member for brake torque generation, said mechanism mechanically directing the forces, so that the torque from each of said respectively operative torque connections opposes the said application pressure on said contrivance for such respective direction through said application connection, for torque-controlled torque-correction.

9. In a brake system, having a rotatable drum to be braked, a relatively anchored retarding device frictionally engageable therewith, and a servo shoe connected to apply said device against said drum, an external force actuated brake applying means having application connection with said shoe to thrust it against said drum with a line of force at such connection directioned substantially drum-radially, permitting the shoe to rotate in either direction, a fixed support, a lever within said drum pivotally mounted on said support, which lever has a shorter arm extending generally outwardly towards said drum, which arm has torque-receptive connection with a high torque portion of said device in respect to one rotational direction, and which lever has a further substantially longer arm extending generally between said shoe and the drum center and generally perpendicularly to said line of applying force, said longer arm being associated with the said applying means so that said torque opposes said application force with a reduced ratio, for torque-correction.

10. In a brake system, a rotatable member to be braked for either rotative direction, a retarding device within and frictionally engageable therewith, anchor means to check said device against rotation in a given direction, a brake torque communicating thrust link connecting said device with said anchor, and a servo element frictionally engageable with and arranged to be limitedly rotatable by said rotatable member to apply said device for either direction and having connection with said thrust link for applying said device therethrough for braking in the other than said given rotative direction.

11. In a brake system, a rotatable member to be braked in either direction, a retarding device frictionally engageable therewith, anchor means to check said device against rotation, a thrust link connecting said device with said anchor, a servo element frictionally engageable with and limitedly rotated by said member, and an intermediate leverage multiplying lever, one effectual end of which is pivotally sustained from a fixed support, the other end of which is arranged to be forcefully moved by said element, said thrust link having force-receptive connection with said lever at a point intermediate its pivot and said element, the swinging of said lever about said pivot by said element thrusting said device against said member through said link, with amplified pressure for braking in the other direction.

12. In a brake system, a rotatable member to be braked, a limitedly circumferentially shiftable retarding contrivance frictionally engageable therewith, a brake applying device having connection with said contrivance to press it against said member to initiate torque for one direction of rotation, and additional brake torque anchoring and transmitting means for such direction of rotation, separate from said applying device, and including a fixed anchoring member, and a torque communicating element movably sustained thereby having brake torque receptive connection with said contrivance, and having torque-dispensive connection with said applying device arranged directionally so that said torque opposes the brake application pressure.

13. In a brake system, a rotatable member having a drum to be braked, a retarding device frictionally engageable with said drum, a second retarding element arranged by its frictional engagement and rotation with said drum to press said device against said drum, external force actuated means applying said element, and a combined brake torque anchoring and transmission mechanism, comprising a floating thrust element having brake torque-receptive connection with said device and directioned in respect to said connection so as to reactionally increase the pressure of said device against the drum with a substantial ratio, a fixed support, a member movably mounted thereon, having torque-receptive connection with said thrust element and being torque dispensively associated with said second retarding element and applying means combination so that said torque opposes the application force, for torque-controlled torque correction.

14. In a brake system, having a rotatable element to be braked by a frictionally therewith engageable retarding device, and a servo shoe adapted upon rotation of the element in either direction to apply said device, external force means arranged to apply the servo shoe, an operable brake torque anchoring and transmission mechanism, for at least one rotational direction, comprising a bearing sustaining fixed support, a torque receiving and transmitting effectual lever movably pivoting on said support by means of antifrictional bearing construction, a thrust link torque-receptively connecting an arm of said lever with a high brake torque portion of said device, said lever having further effectual connection with said servo shoe and external force means combination whereby said torque is transmitted to oppose the application pressure, said antifrictional bearing construction carrying and anchoring the brake torque stress operating said lever.

15. In a brake system, a rotatable member to be braked in at least one direction, a retarding contrivance frictionally engageable therewith, a brake applying device to press said contrivance against said member and arranged so that the line of applying force against said contrivance is initially directioned substantially rotation-radially, so as to remain substantially unaffected by said rotation, and a combined torque anchoring and transmission mechanism, comprising a floating brake torque thrust link having torque-receptive connection with a high torque portion of said contrivance and directionally disposed in respect to said connection so as to react to press said contrivance against said member with a substantial ratio of force, a fixed support, a member movably fulcruming thereabout having torque-receptive connection with said link and having torque-dispensive connection with said applying device to oppose the application pressure, for torque-controlled torque correction.

16. In a brake system, a rotatable member to be braked in either direction of rotation and having a cylindrical drum portion, a therewith frictionally engageable retarding device, shiftable limitedly and anchorable reversely for either direction of rotation, a servo shoe frictionally engageable with said drum to be limitedly rotated thereby and having connection with said device to press it against said drum by said either directional rotation, servo shoe applying means comprising a force communication member arranged to rollably bear on said shoe with a line of stress initially directioned substantially drum-radially, permitting said shoe to rotate in either direction, and a combined torque anchoring and transmission mechanism comprising a thrust link having a torque-receptive connection with a high torque portion of said device in respect to one rotational direction, and directionally disposed in respect to said connection so as to reactionally press said device against said drum with a substantial ratio of force, a relatively fixed support, a lever thereon, a shorter arm of which torque-receptively directly connects with said link, a longer arm of which torque-dispensively communicates said torque to oppose the pressure between said shoe and said rotatable member, for torque-controlled torque correction.

17. In a brake system, a rotatable member to be braked, a therewith frictionally engageable retarding device provided with friction facing to contact said member, a servo element arranged to frictionally engage and thereupon be limitedly rotated by said member, rotation communication members including a yieldable cushioning element functionally between said servo element and said facing to press said facing against said rotatable member, means to apply said servo element, and brake torque transmission means arranged so that the brake torque opposes said application.

18. In a vehicle brake system in which a rotatable drum is to be braked by a relatively anchored retarding contrivance having at least one substantially rigid end portion, which contrivance is pressable against said drum, an operatively movable brake torque anchoring and transmission mechanism for torque-correctively opposing such contrivance to drum pressure for at least one braking direction, comprising a fixed anchoring support, a torque communication member pivotally sustained thereby, a thrust element having torque-dispensive connection with said last member, and having torque-receptive connection with said rigid end portion, which element is to a substantial degree rotation-chordally angled in respect to said connection so as to reactionally amplify the brake torque at said end portion of said contrivance, and its said connection with said end portion being located a substantial distance from the respective contrivance end to distribute the force resultant from said amplification over a larger lining area to both sides of said connection.

19. In a brake system, a rotatable drum to be braked, a therewith frictionally engageable retarding contrivance limitedly circumferentially shiftable and reversely anchorable for either direction of rotation, and constructed as a unitary substantially flexible member having rigidified portions at both its ends, a relatively fixed brake torque anchoring means, a duality of thrust links each having direct connection with a respective end portion of said contrivance and each having further torque-dispensive connection with said anchor means to check rotation, and contrivance applying means for both rotational directions arranged to thrust through each of said links for the respective direction, the drum rotation amplifying the initial brake torque through the mediate flexible portion of said contrivance and thrusting it against said anchor means through the other thrust link in respect to such direction, each of said links being to a substantial degree rotationchordally angled in respect to its torque-receptive contrivance connection so as to reactionally amplify the brake torque at such respective end portions, and each of said last connections being located a substantial distance from the respective contrivance ends to distribute the reactionally amplified pressure over a larger lining area of the respective end portions of said contrivance, to each side of its respective connection.

20. In a brake system in which a movable member is to be braked by a relatively anchored retarding contrivance pressed thereagainst by external force application, a brake torque correction mechanism to transmit brake torque from said contrivance to modify said application, comprising a fixed support sustaining a bearing surface, and a brake torque communication lever having a substantially convexedly curved surface for rollably rocking on said first surface, for antifrictional torque communication.

21. In a brake the combination of a rotatable drum, a friction device for cooperation with a surface thereof, an actuator shoe engageable with the drum and adapted upon rotation of the drum in either direction to be shifted thereby to act on the friction device to apply the same, driver-operated means for applying the actuator shoe, and means whereby torque from the braking operation in either direction of rotation opposes the driver-operated means.

22. In a brake the combination of a rotatable drum, a friction device for cooperation with a surface thereof, an actuator shoe engageable with the drum and adapted upon rotation of the drum in either direction to be shifted thereby to act upon the friction device to apply the same, driver-operated means for applying the actuator shoe, and means whereby torque from the braking operation in either direction of drum rotation opposes the driver-operated means.

23. In a brake the combination of a rotatable drum, a friction device for cooperation with a surface thereof, an actuator shoe engageable with the drum and adapted upon either direction of drum rotation to be shifted thereby to press the device against the drum, intermediate pressure-multiplying leveraging means to amplify such either directional actuation of the device by the shoe, external force actuating means adapted to apply the actuator shoe to the drum through a substantially drum-radially directioned line of application force, and means whereby the torque from the braking operation in at least one rotational direction opposes said external force means.

24. In a brake the combination of a rotatable drum, a retarding device for frictional cooperation with a surface thereof, an actuator shoe engageable with the drum and arranged to be limitedly shifted thereby upon rotation of the drum in either direction to apply the retarding device, anchor means to check rotation of the device in one direction, a thrust link therefor connecting said means and device, and connection between said shoe and link, whereby the device is applied by the shoe through said link for the other direction of rotation.

25. In a brake the combination of a rotatable drum, a retarding device for frictional engagement with a surface thereof, a servo shoe engageable with the drum and arranged to be shifted thereby and to press the device against the drum upon either direction of drum rotation, anchor means to check rotation of the device for a given direction, and a thrust link therefor connecting the device and anchor means, said link being reactionally angled to a substantial degree in respect to the device to substantially amplify the pressure between the device and drum.

BERNARD HY. MOSSINGHOFF.